Patented Nov. 20, 1951

2,575,629

UNITED STATES PATENT OFFICE 2,575,629

PREPARATION OF MELAMINE

William J. Klapproth, Jr., Stamford, Conn., assignor to American Cyanamid Company, New York, N. Y., a corporation of Maine No Drawing. Application October 25, 1950,
Serial No. 192,160

2 Claims. (Cl. 260—249.7)

The present invention relates to the preparation of melamine.

It is an object of the invention to prepare melamine by heating hydrogen cyanide with ammonium sulfate, ammonium sulfamate, diammonium imidodisulfate, sulfamide, or triammonium nitrilo trisulfate in a closed reaction zone. Additional objects will be apparent from the discussion hereinafter.

The invention contemplates heating hydrogen cyanide with one of the compounds above disclosed in a closed reaction zone at a temperature in the range of 275°–550° C. and under a pressure of at least 500 p. s. i., under which conditions melamine is formed, and can be recovered by means well known in the art. There is nothing critical in the ratio of the reactants. Melamine is formed when the HCN:ammonia compound mole ratios within the range of 1–20:1–20 or even wider are used. While the temperature range 275°–550° C. is operable, the narrower range of 350°–400° C. is preferred.

The following examples illustrate without limiting the invention.

Example 1

22 g. of hydrogen cyanide and 44 g. of ammonium sulfate, $(NH_4)_2SO_4$, were charged to a 310-cc. autoclave, which was then sealed and heated at 350° C. for 6 hours under the autogenously produced pressure of 1000 p. s. i. After the reaction the autoclave was cooled and vented and its contents slurried in 300 cc. of hot water. The slurry was heated nearly to the boiling point to precipitate HCN polymer, and then filtered. Melamine was recovered by evaporating the solution to dryness over a steam bath to provide crystals of melamine sulfate and unreacted ammonium sulfate. The mixed crystals were then redissolved in hot water, which was then cooled to precipitate melamine sulfate. Melamine can be recovered by dissolving the sulfate, adding $Ba(OH)_2$, filtering off $BaSO_4$, and concentrating to crystallize out melamine. Any other of the known methods of recovering melamine from reaction masses containing it can also be used.

Example 2

The yield of melamine is improved if ammonia is added to the charge. In one run, 16 g. of HCN, 49 g. of $NH_3$, and 44 g. of $(NH_4)_2SO_4$ reacted at 350° C. for 6 hours under the autogenously-developed pressure of 5400 p. s. i. gave a substantially better yield than obtained when the ammonia was omitted.

Sulfamide, ammonium sulfamate, or triammonium nitrilo trisulfate can be used instead of the ammonium salts used in the above examples.

Example 3

Into 310-cc. autoclave with single inlet in head (the "reactor autoclave") was placed 0.5 g. of crude diammonium imido disulfate analyzing ammonium sulfamate, 3.8 wt. percent, diammonium imido disulfate, 71.8, triammonium nitrilo trisulfate, 21.5, and free $NH_3$ 2–9%. The autoclave was then closed, flushed out with $NH_3$, and heated to 350° C.

Into a second 310-cc. autoclave (the "feed clave") fitted with two inlets in its head, one carrying a dip-leg, was put 0.10 g. of the above crude diammonium imido disulfate. The autoclave was closed, flushed with $NH_3$, and to it was added 52 g. of liquid $NH_3$ and 20 g. of HCN, making a solution of $NH_5CN$ in liquid $NH_3$. Nitrogen was pumped into this autoclave to 7000 p. s. i.

The feed autoclave was then connected (in inverted position) to the reactor autoclave, following which the $NH_3$—$NH_4CN$ solution was introduced slowly into the reactor autoclave (still at 350° C.) over a 50 minute period. The reactor was kept at 350° C. for an additional 50 minutes, then quenched to room temperature, and the $NH_3$ and $N_2$ vented. The reactor autoclave was opened, and the black product scraped and washed out. The washings were boiled gently for 30 minutes to extract the melamine. One g. of charcoal was added to aid in clarification, and the slurry filtered hot. There was obtained 225 cc. of solution which contained 0.50 g. of melamine (analysis by precipitation of cyanurate from an aliquot portion). The melamine was recovered by reducing the volume of the solution, then cooling to cause the melamine to crystallize out of solution.

While the invention has been described with particular reference to specific embodiments, it is to be understood that it is not to be limited thereto but is to be construed broadly and restricted solely by the scope of the appended claims.

I claim:

1. The method of preparing melamine that comprises heating hydrogen cyanide and a member of the group consisting of diammonium imido disulfate, triammonium nitrilotrisulfate, ammonium sulfamate, sulfamide, and ammonium sulfate in a closed reaction zone at a temperature of about 275°–550° C. and under a pressure of at least 500 p. s. i., whereby melamine is formed, and recovering the thus-formed melamine.

2. The method of preparing melamine that comprises heating together hydrogen cyanide, ammonium sulfate, and ammonia in a closed reaction zone at a temperature of about 350°–400° C. under the autogenously developed pressure, whereby melamine is formed, and separating the thus-formed melamine.

WILLIAM J. KLAPPROTH, JR.

No references cited.